United States Patent
Yu et al.

(10) Patent No.: US 10,244,494 B2
(45) Date of Patent: *Mar. 26, 2019

(54) APPARATUS AND METHOD FOR SYNCHRONIZING AND OBTAINING SYSTEM INFORMATION IN WIRELESS COMMUNICATION SYSTEM

(71) Applicant: Samsung Electronics Co., Ltd., Gyeonggi-do (KR)

(72) Inventors: Hyun-Kyu Yu, Yongin-si (KR); Tae-Young Kim, Seongnam-si (KR); Jae-Weon Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/648,355

(22) Filed: Jul. 12, 2017

(65) Prior Publication Data
US 2017/0311274 A1   Oct. 26, 2017

Related U.S. Application Data

(63) Continuation of application No. 13/606,773, filed on Sep. 7, 2012.

(30) Foreign Application Priority Data

Sep. 9, 2011 (KR) .......................... 10-2011-0091913

(51) Int. Cl.
*H04L 27/28* (2006.01)
*H04W 56/00* (2009.01)
(Continued)

(52) U.S. Cl.
CPC ......... *H04W 56/001* (2013.01); *H04W 48/12* (2013.01); *H04W 72/046* (2013.01); *H04W 16/28* (2013.01)

(58) Field of Classification Search
None
See application file for complete search history.

(56) References Cited

U.S. PATENT DOCUMENTS 6,233,466 B1 *  5/2001  Wong .................... H01Q 1/246
                                                   370/342
7,920,508 B2    4/2011  Chang et al.
(Continued)

FOREIGN PATENT DOCUMENTS

CN    1461159 A      12/2003
CN    101489285 A    7/2009
(Continued)

OTHER PUBLICATIONS

Japanese Patent Office, "Notice of Preliminary Rejection," Japanese Application No. JP2014-529608, Nov. 14, 2016, 19 pages, publisher JPO, Tokyo, Japan.
(Continued)

*Primary Examiner* — Sithu Ko (57) ABSTRACT

A base station and terminal use methods of obtaining synchronization and system information in a wireless communication system. An operation of a base station includes generating a synchronization signal to be transmitted through a Synchronization Channel (SCH), generating a broadcast signal to be transmitted through a Broadcast Channel (BCH), and transmitting repetitively the SCH and the BCH by performing beamforming on the channels with different transmission beams.

20 Claims, 7 Drawing Sheets

(51) Int. Cl.
*H04W 72/04* (2009.01)
*H04W 48/12* (2009.01)
*H04W 16/28* (2009.01)

(56) References Cited

U.S. PATENT DOCUMENTS

| | | | |
|---|---|---|---|
| 8,909,174 | B2 | 12/2014 | Howard et al. |
| 8,923,785 | B2 | 12/2014 | Howard et al. |
| 2004/0009755 | A1 | 1/2004 | Yoshida |
| 2005/0037799 | A1 | 2/2005 | Braun et al. |
| 2008/0039013 | A1 | 2/2008 | Chang et al. |
| 2009/0116565 | A1* | 5/2009 | Ahn .................. H04B 7/0408 375/260 |
| 2009/0252109 | A1* | 10/2009 | Kim .................. H04B 7/0689 370/330 |
| 2009/0290657 | A1 | 11/2009 | Howard et al. |
| 2010/0056062 | A1* | 3/2010 | Zhang .................. H04B 7/0617 455/63.1 |
| 2010/0135257 | A1 | 6/2010 | Higuchi et al. |
| 2011/0064032 | A1 | 3/2011 | Sun et al. |
| 2011/0194639 | A1 | 8/2011 | Nakao et al. |
| 2012/0320831 | A1* | 12/2012 | Lee .................. H04W 56/0015 370/328 |

FOREIGN PATENT DOCUMENTS

| | | | |
|---|---|---|---|
| CN | 101572684 | A | 11/2009 |
| CN | 101690340 | A | 3/2010 |
| CN | 101771641 | A | 7/2010 |
| JP | 2005065257 | | 3/2005 |
| WO | 2005114868 | A1 | 12/2005 |
| WO | 2007124635 | A1 | 11/2007 |
| WO | 2009092332 | A1 | 7/2009 |
| WO | 2010149008 | A1 | 12/2010 |

OTHER PUBLICATIONS

State Intellectual Property Office of the P.R.C., "First Office Action," Chinese Application No. 201280043902.2, Jan. 18, 2017, 22 pages, publisher SIPO, Beijing Shi, China.
Dismissal for Amendment dated Mar. 9, 2017 in connection with Japanese Patent Application No. 2014-529608.
International Search Report dated Feb. 21, 2013, in connection with International Application No. PCT/KR2012/007091, 4 pages.
Written Opinion of International Searching Authority dated Feb. 21, 2013 in connection with International Application No. PCT/KR2012/007091, 4 pages.
Patent Examination Report No. 1 dated Nov. 24, 2014, in connection with Australian Patent Application No. 2012305126, 3 pages.
Extended European Search Report dated Mar. 12, 2015, in connection with European Patent Application No. 12829615.9, 6 pages.
Notice of Acceptance dated Jul. 30, 2015, in connection with Australian Patent Application No. 2012305126, 2 pages.
Foreign Communication from Related Counterpart Application, Korean Patent Application No. 10-2011-0091913, Notice of Preliminary Rejection dated Jun. 17, 2017, 8 pages.
Chinese Office Action for Chinese Application No. 201280043902. 2, dated Sep. 14, 2017. (21 pages).
Japanese Pre-Appeal Examination Report for Japanese Application No. 2014-529608, dated Aug. 18, 2017. (8 pages).
Communication from a foreign patent office in a counterpart foreign application, European Patent Office, "Communication pursuant to Article 94(3) EPC," Application No. EP 12 829 615.9. dated Feb. 22, 2018, 6 pages.
Communication from a foreign patent office in a counterpart foreign application, Koreal Intellectual Property Office, "Notice of Final Rejection," Application No. KR 10-2011-0091913, dated Dec. 6, 2017, 8 pages.
Communication from a foreign patent office in a counterpart foreign application, Koreal Intellectual Property Office, "Notice of Final Rejection," Application No. KR 10-2011-0091913, dated Feb. 6, 2018, 8 pages.
USPTO, "Notice of Allowability," U.S. Appl. No. 13/606,773, dated Nov. 30, 2017, 9 pages.
Office Action dated Jun. 19, 2018 in connection with Canadian Patent Application No. 2,847,676.
Office Action dated Jul. 13, 2018 in connection with Chinese Patent Application No. 201280043902.2.
Trial Decision regarding Japanese Patent Application No. 2014-529608, dated Dec. 10, 2018, 50 pages.

* cited by examiner

APPARATUS AND METHOD FOR SYNCHRONIZING AND OBTAINING SYSTEM INFORMATION IN WIRELESS COMMUNICATION SYSTEM

CROSS-REFERENCE TO RELATED APPLICATION(S) AND CLAIM OF PRIORITY

The present application is a continuation of U.S. patent application Ser. No. 13/606,773 filed Sep. 7, 2012, and is related to and claims the benefit under 35 U.S.C. § 119(a) of a Korean patent application filed in the Korean Intellectual Property Office on Sep. 9, 2011 and assigned Serial No. 10-2011-0091913, the entire disclosures of each are hereby incorporated by reference.

TECHNICAL FIELD

The present disclosure relates to a wireless communication system.

BACKGROUND

In order to satisfy increasing demands on wireless data traffic, wireless communication systems are under development that support higher data transfer rates. Techniques of $4^{th}$ Generation (4G) systems, which are now being commercialized, are being developed to improve spectral efficiency in general to increase the data transfer rate. However, the techniques of improving the spectral efficiency are not enough to satisfy the explosively increasing demands on the wireless data traffic.

In one method of solving the aforementioned problem, a significantly wide frequency band is used. A frequency band used in a conventional mobile communication cellular system at present is less than or equal to 10 GigaHertz (GHz) in general, and thus it is very difficult to ensure a wide frequency band. Therefore, there is a need to ensure a wideband frequency in a higher frequency band. However, the higher the frequency for wireless communication, the greater the propagation path loss. Accordingly, a propagation distance is relatively short, which results in a coverage decrease. As a method of solving this problem, beamforming techniques are used to decrease the propagation path loss and to increase the propagation distance.

Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming decreases the RX signal strength transmitted in a specific direction by allowing propagation to be concentrated in a specific direction, and excludes a signal transmitted in a direction other than the specific direction from the RX signal, thereby providing an effect of blocking an interference signal.

As described above, in order to promote wide frequency bands, a super-high frequency band, in other words, millimeter (mm) wave system, may be introduced. In this situation, a beamforming technique is taken into consideration to overcome the propagation path loss. In this technique, a signal subjected to beamforming is transmitted and received starting from an initial access time point. Accordingly, there is a need for a method in which a user terminal obtains synchronization and system information in an environment where beamforming is performed.

SUMMARY

To address the above-discussed deficiencies of the prior art, it is a primary object to provide at least the advantages described below. Accordingly, an aspect of the present disclosure is to provide an apparatus and method for obtaining synchronization by using a Synchronization Channel (SCH) subjected to beamforming in a wireless communication system.

Another aspect of the present disclosure is to provide an apparatus and method for obtaining system information from a Broadcast Channel (BCH) subjected to beamforming in a wireless communication system.

Another aspect of the present disclosure is to provide an apparatus and method for determining a preferred transmission beam and a preferred reception beam by using a SCH.

Another aspect of the present disclosure is to provide an apparatus and method for obtaining frame synchronization by using system information in a wireless communication system.

In accordance with an aspect of the present disclosure, a method of operating a base station in a wireless communication system is provided. The method includes generating a synchronization signal to be transmitted through a SCH, generating a broadcast signal to be transmitted through a BCH, and transmitting repetitively the SCH and the BCH by performing beamforming on the channels with different transmission beams.

In accordance with another aspect of the present disclosure, a method of operating a terminal in a wireless communication system is provided. The method includes detecting at least one of SCHs repetitively transmitted by being beam-formed with different transmission beams, and obtaining system information by using at least one of BCHs repetitively transmitted by being beam-formed with different transmission beams.

In accordance with another aspect of the present disclosure, a base station apparatus in a wireless communication system is provided. The apparatus includes a modem configured to generate a synchronization signal to be transmitted through a SCH and generate a broadcast signal to be transmitted through a BCH. The apparatus also includes a beamforming unit configured to perform beamforming on the SCH and the BCH with different transmission beams. The apparatus further includes a controller configured to transmit repetitively the SCH and the BCH which are beam-formed with the different transmission beams.

In accordance with another aspect of the present disclosure, a terminal apparatus in a wireless communication system is provided. The apparatus includes a modem configured to detect at least one of SCHs repetitively transmitted by being beam-formed with different transmission beams. The apparatus also includes a controller configured to obtain system information by using at least one of BCHs repetitively transmitted by being beam-formed with different transmission beams.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1A through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

The present disclosure relates to an apparatus and method for synchronizing and obtaining system information in the wireless communication system. The present disclosure described hereinafter relates to a technique for obtaining synchronization from a Synchronization Channel (SCH) subjected to beamforming and for obtaining system information from a Broadcast Channel (BCH) in a wireless communication system.

The SCH is a resource period for delivering a synchronization signal for obtaining time/frequency synchronization of a terminal, and has a pre-set fixed position on a frame. The synchronization signal consists of a pre-agreed sequence, and can also be referred to as a preamble, a midamble, etc. In the following description, remarks such as "a SCH is transmitted/received", "a synchronization signal is transmitted/received", and the like, are used for the same meaning.

The BCH is a resource period for delivering system information used to access and communicate with a system, and has a pre-set fixed position on the frame. The BCH can also be referred to as a frame header, a superframe header, etc. In the following description, remarks such as "a BCH is transmitted/received", "a broadcast signal is transmitted/received", "system information is transmitted/received" or the like are used for the same meaning.

In general, a mobile communication system adopts the concept of a "cell". Accordingly, a handover process is performed when a terminal moves from one cell to another cell. Although it may differ depending on system characteristics, one Base Station (BS) generally forms a plurality of sectors by using a plurality of sector antennas. In addition, an "antenna area" is defined in the present disclosure as subordinated concept of the cell. The antenna area is a regional unit in which beamforming is performed. In one cell, antenna areas are distinguished by antenna identifiers (IDs). A beam index allocated to each TX beam is unique in one antenna area. For each antenna area, at least one Radio Frequency (RF) chain and antenna area can be allocated, or antenna elements belonging to one antenna array can be allocated in a divided manner. Hereinafter, for convenience of explanation, a group of at least one antenna for one antenna area is called an 'antenna group'. That is, one antenna group is allocated to one antenna area. Antenna groups can be arranged physically in the same space or in separate spaces.

Figure 1A:
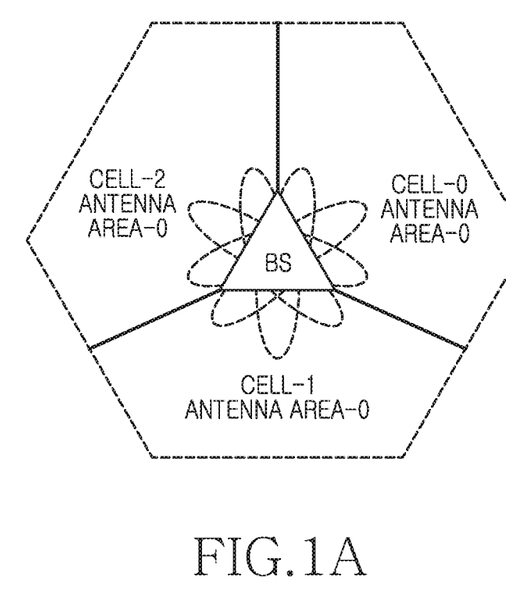
FIGS. 1A and 1B illustrate an example of a cell structure in a wireless communication system according to an embodiment of the present disclosure.
Figure 1B:
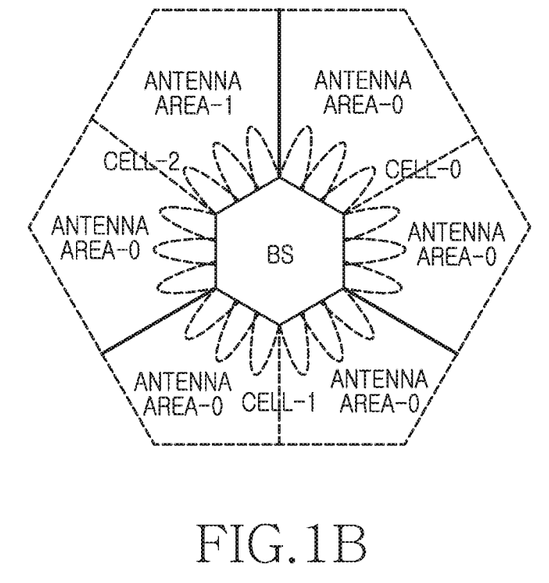

FIGS. 1A and 1B illustrate an example of a cell structure in a wireless communication system according to an embodiment of the present disclosure. FIG. 1A illustrates a structure where each cell has one antenna area, and FIG. 1B illustrates a structure where each cell has two antenna areas. Referring to FIGS. 1A and 1B, a BS operates three cells, and each antenna area supports three TX beams. When transmitting a SCH or a BCH, as shown in FIG. 1A, the BS changes a TX beam in one cell and transmits three signals across three unit-time periods. Alternatively, as shown in FIG. 1B, the BS can change a TX beam in one cell and transmit six signals across three unit-time periods. That is, since two signals belonging to different antenna areas are spatially multiplexed in the embodiment shown in FIG. 1B, the BS can simultaneously transmit signals in an antenna area-0 and an antenna area-1 by using different antenna groups.

If each antenna area has the same number of TX beams, the greater the number of antenna areas, the more efficiently the communication can be performed by the system by using narrow beams. Alternatively, if each cell has the same number of TX beams, the greater the number of antenna areas, the less the resource amount required by the system for transmission of the SCH and the BCH. Although it is described in FIGS. 1A and 1B that each antenna area has three TX beams, according to another embodiment of the present disclosure, four or more TX beams having a narrower beam width can be used.

Figure 2:
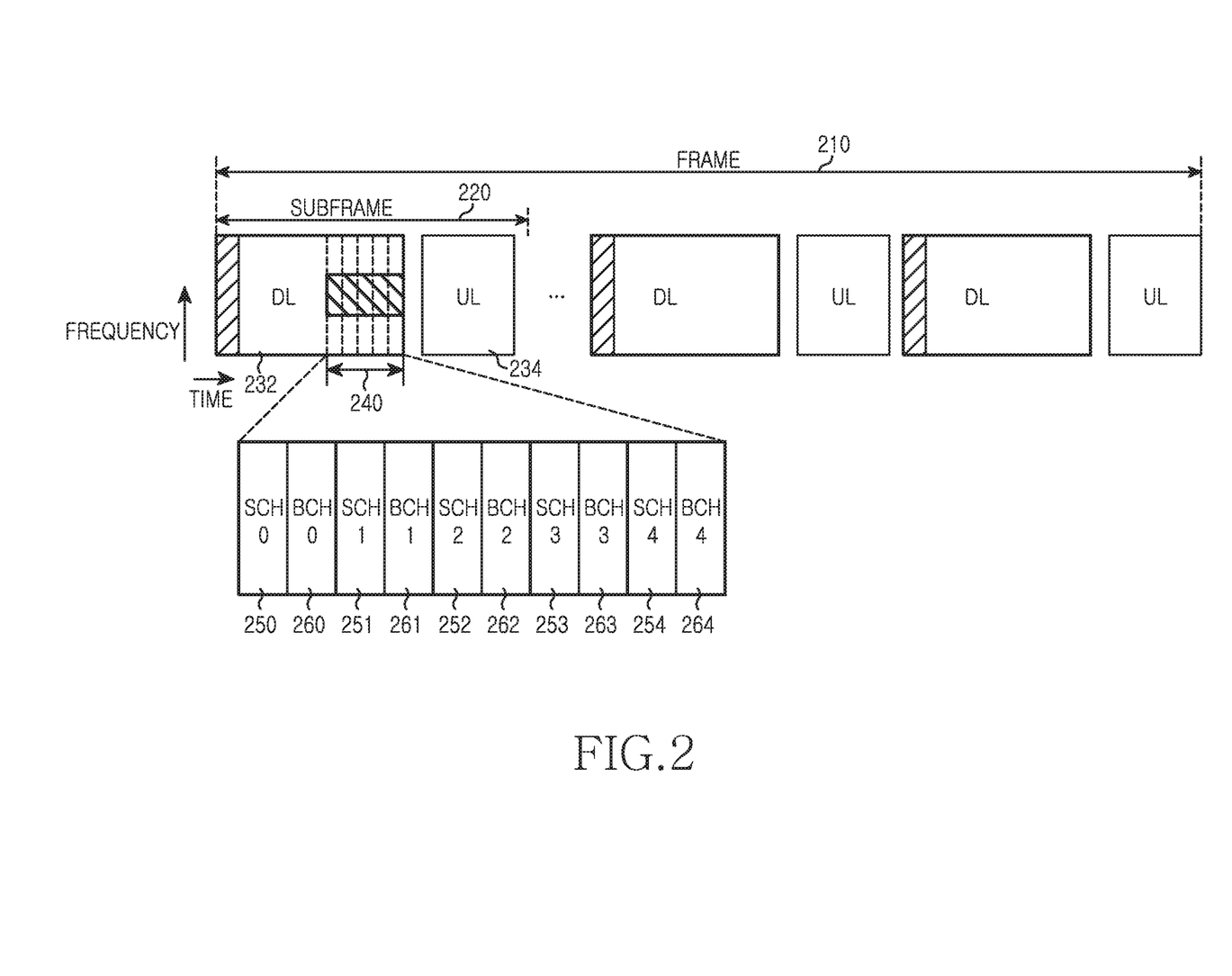
FIG. 2 illustrates an example structure of a Synchronization Channel (SCH) and a Broadcast Channel (BCH) in a wireless communication system according to an embodiment of the present disclosure.

FIG. 2 illustrates an example structure of a SCH and a BCH in a wireless communication system according to an embodiment of the present disclosure. It is assumed in FIG. 2 that five TX beams are supported.

Referring to FIG. 2, a frame 210 includes a plurality of subframes 220. The subframe 220 is divided into a DownLink (DL) period 232 and an UpLink (UL) period 234. Although the DL period 232 and the UL period 234 are divided in a time axis in FIG. 2, according to another embodiment of the present disclosure, the DL period 232 and the UL period 234 can be divided in a frequency axis. Some parts of the DL period 232 are defined as a SCH/BCH period 240. The SCH/BCH period 240 is included periodically. In the embodiment of FIG. 2, the SCH/BCH period exists in every frame.

The SCH/BCH period 240 is located at a rear part of the DL period 232. That is, a last symbol of a BCH-4 264 located at a rearmost part of the SCH/BCH period 240 is a last symbol of the DL period 232. Therefore, synchronization of the frame 210 can be obtained by determining a position of the last BCH 264. However, according to another embodiment of the present disclosure, the SCH/BCH period 240 can be arranged in the subframe 220 or the frame 210 in a distributed manner, or can be located in a front or middle part of the DL period 232 instead of being located in the rear part thereof. In addition, according to another embodiment of the present disclosure, the SCH/BCH period 240 included in one DL period 232 may be plural in number.

The SCH/BCH period 240 includes a plurality of SCHs 250-254 and a plurality of BCHs 260-264. One SCH and one BCH are paired to each other. The SCH and BCH included in one pair are beam-formed with a TX beam in the same direction. That is, a SCH-0 250 and a BCH-0 260 are beam-formed in a TX beam in the same direction. Further, five SCH/BCH pairs included in one frame 210 are beam-formed with a TX beam in different directions. The number of SCH/BCH pairs can vary depending on the number of TX beams supported by a BS. In FIG. 2, one SCH and one BCH which are paired to each other are adjacent in a time axis. However, according to another embodiment of the present disclosure, the SCH and the BCH which are paired to each other can be spaced apart from each other by a length of a pre-set number of symbols. For example, the plurality of SCHs 250-254 can be contiguously arranged, and the plurality of BCHs 260-264 can be contiguously arranged. In addition, according to another embodiment of the present disclosure, the plurality of SCHs 250-254 can consist of two symbols respectively distinguished as a primary SCH and a secondary SCH.

Synchronization signals transmitted through the SCHs 250-254 indicate cell IDs. Further, if there are a plurality of antenna areas as shown in FIG. 1B, the synchronization signals can further indicate antenna area IDs. The cell ID and the antenna area ID can be indicated by using at least one of a sequence constituting the synchronization signal, a position of a subcarrier to which the synchronization signal is mapped, a scrambling code for the synchronization signal, and a covering code.

In addition, the SCHs 250-254 deliver synchronization signals which are beam-formed by using different TX beams, and the different TX beams are identified by using beam IDs. According to one embodiment of the present disclosure, the beam IDs can be indicated by using the SCHs 250-254. For example, the beam ID can be indicated by using at least one of a sequence constituting the synchronization signal, a position of a subcarrier to which the synchronization signal is mapped, a scrambling code for the synchronization signal, and a covering code. According to another embodiment of the present disclosure, the beam ID can be included in system information transmitted through the BCHs 260-264. In this situation, a beam ID of a TX beam applied to the SCH-0 250 is included in the system information transmitted through the BCH-0 260. If the beam ID is transmitted through the BCHs 260-264, a synchronization signal has a relatively simple structure, and thus a process of obtaining synchronization becomes simple and clear. Otherwise, if the beam ID is indicated through the SCHs 250-254, the same system information is transmitted through all of the BCHs 260-264. In this situation, since the same physical signal is generated from the system information, the terminal can obtain a decoding gain by combining signals received through the BCHs 260-264. However, even if the beam ID is transmitted through the BCHs 260-264, when the beam ID is used as a scrambling code of the system information rather than one information item of the system information, the terminal can increase the decoding gain by combining the signals after performing descrambling.

To obtain frame synchronization of the terminal, the system information includes information capable of determining a boundary of the SCH/BCH period 240. The SCH/BCH period 240 has a fixed position in the frame. Therefore, when the position of the SCH/BCH period 240 can be known, the terminal can determine the boundary of the frame. The terminal can detect at least one of the SCHs 250 to 254 which are beam-formed with different TX beams. However, one SCH is not enough to correctly know the boundary of the SCH/BCH period 240. This is because the terminal cannot know the number of SCHs other than the SCH detected by the terminal itself. Therefore, after determining the number of SCHs by using the system information, in other words, after determining the number of TX beams supported by the BS, the terminal can determine the number of SCHs other than the SCH detected by the terminal itself by using the number of TX beams, and can determine the boundary of the SCH/BCH period 240. For example, as shown in FIG. 2, if the last symbol of the SCH/BCH period 240 is the last symbol of the DL period 232, the terminal that detects the SCH-2 252 confirms that the number of TX beams is five by using the system information, and determines that two more SCHs are present subsequently to the SCH-2 252. Accordingly, the terminal can determine a last symbol position of the SCH/BCH period 240, and can determine an end boundary of the DL period 232. If a positional relation between the SCH/BCH period 240 and the boundary of the subframe 220 is not pre-set, the positional relation between the SCH/BCH period 240 and the boundary of the subframe 220 can be delivered by using the system information.

It is illustrated in FIG. 2 that one DL period 232 and one UL period 234 are included in the range of the subframe 220, and a group of a plurality of subframes 220 corresponds to the frame 210. However, according to another embodiment of the present disclosure, the subframe 220 can be called a frame, and the frame 210 can be called a superframe.

Figure 3:
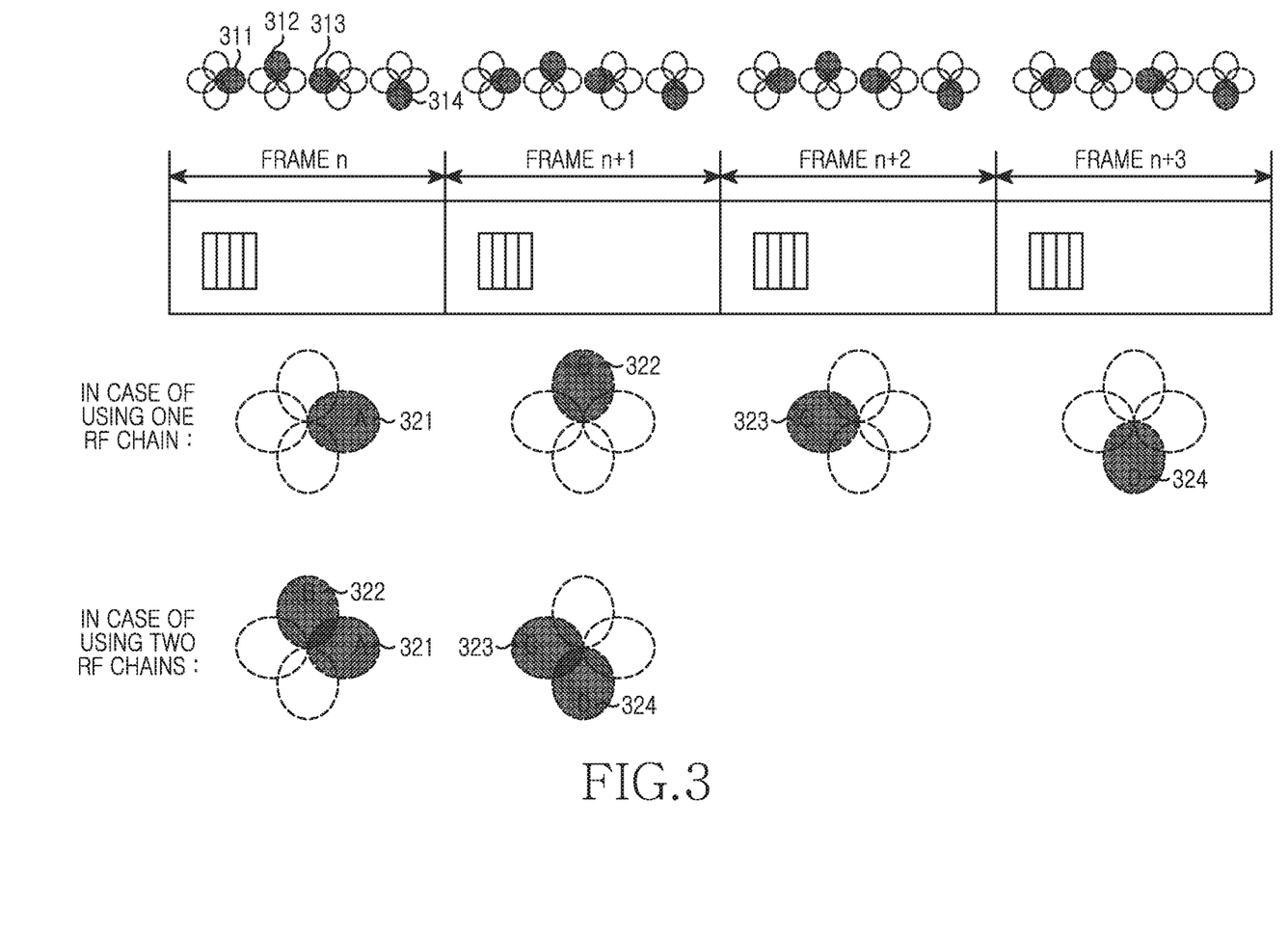
FIG. 3 illustrates a method of determining a reception beam by using a SCH in a wireless communication system according to an embodiment of the present disclosure.

FIG. 3 illustrates a method of determining a RX beam by using a SCH in a wireless communication system according to an embodiment of the present disclosure. It is assumed in FIG. 3 that a BS supports four TX beams, and a terminal supports four RX beams.

Referring to FIG. 3, the BS periodically transmits SCHs in every frame. That is, each frame includes one TX period of the SCH. In this situation, during one frame, the BS applies beamforming to the SCHs by using supportable TX beams. In other words, the BS transmits the SCH four times in every frame, and four SCHs are beam-formed with a TX beam A 311, a TX beam B 312, a TX beam C 313, and a TX beam D 314.

Accordingly, the terminal changes a RX beam in every frame and receives the SCHs across a plurality of frames. For one example, if the terminal has only one RX RF chain, the terminal performs beamforming by using one RX beam in every frame, and receives the SCHs only during four frames. That is, as shown in FIG. 3, the terminal performs RX beamforming by using the RX beam A 321 in a frame n, the RX beam B 322 in a frame n+1, the RX beam C 323 in a frame n+2, and the RX beam D 324 in a frame n+3. For another example, if the terminal has two RX chains, the terminal performs beamforming in every frame by using two RX beams, and receives the SCHs during two frames. That is, as shown in FIG. 3, the terminal performs RX beamforming by using the RX beam A 321 and the RX beam B 322 in the frame n, and the RX beam C 323 and the RX beam D 324 in the frame n+1.

By using the aforementioned process, the terminal receives the SCHs by combining all TX beams and RX beams. Accordingly, the terminal can determine one combination which maximizes RX signal strength as an optimal TX beam and an optimal RX beam.

A beam width of a TX beam used in the BS is not limited in the embodiment of FIG. 3. However, according to another embodiment of the present disclosure, the terminal can determine the optimal TX beam by using TX beams having different beam widths in a stepwise manner.

Hereinafter, an operation and structure of a terminal and a BS which use a SCH and a BCH having the aforementioned structure will be described in detail with reference to the accompanying drawings.

Figure 4:
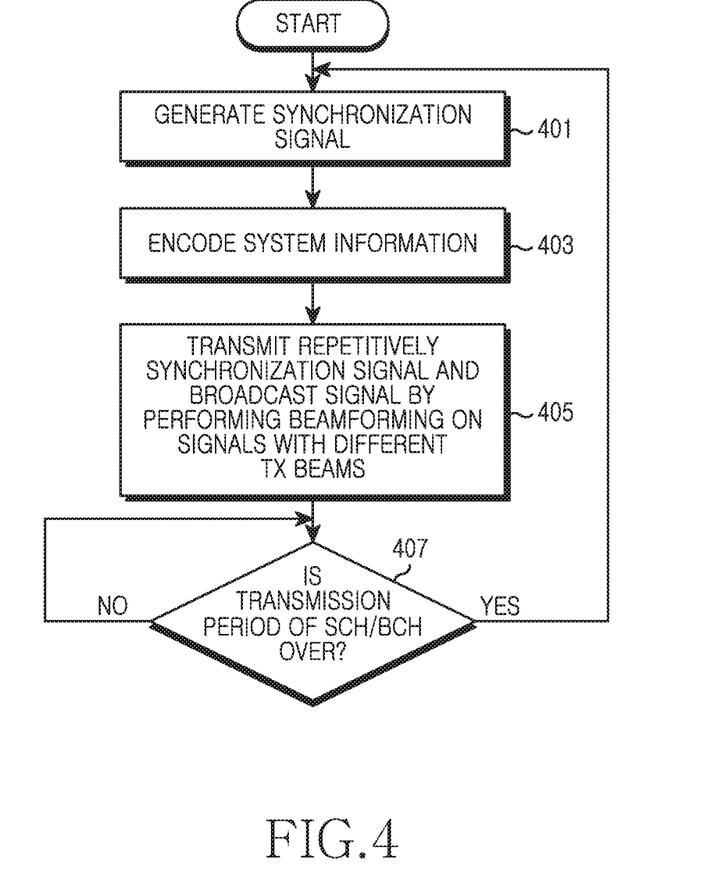
FIG. 4 is a flowchart illustrating an operation of a base station in a wireless communication system according to an embodiment of the present disclosure.

FIG. 4 is a flowchart illustrating an operation of a BS in a wireless communication system according to an embodiment of the present disclosure.

Referring to FIG. 4, the BS generates a synchronization signal in block 401. The synchronization signal is a signal that includes a pre-set sequence transmitted through a SCH. The synchronization signal indicates a cell ID. When the BS operates a plurality of antenna areas in one cell, the synchronization signal further indicates an antenna area ID. In this situation, the BS generates different synchronization signals for respective antenna areas. In addition, according to one embodiment of the present disclosure, the synchronization signals can indicate TX beam IDs to be applied. In this situation, the BS generates different synchronization signals for respective TX beams to be applied. The cell ID, the antenna area ID, and the TX beam ID can be indicated by using at least one of a sequence constituting the synchronization signal, a position of a subcarrier to which the synchronization signal is mapped, a scrambling code for the synchronization signal, a covering code, etc. According to another embodiment of the present disclosure, the TX beam ID can be indicated through a BCH, and in this situation, the synchronization signals do not indicate the TX beam IDs to be applied.

In block 403, the BS encodes system information. In other words, the BS generates a broadcast signal to be transmitted through the BCH. The system information includes configuration information, system parameters, etc., used by the terminal to access the BS. For example, the system information can include information for reporting the number of TX beams supported by the BS, information capable of determining a boundary of a SCH/BCH period, etc. If the position of the boundary of the SCH/BCH period on the frame is not pre-set, the system information may further include information for reporting the position of the boundary of the SCH/BCH period on the frame. According to one embodiment of the present disclosure, if the TX beam ID is indicated by the SCH, the broadcast signal is not different for each TX beam but is identical for each TX beam. Alternatively, according to another embodiment of the present disclosure, if the TX beam ID is indicated through the BCH, the broadcast signal is different for each TX beam. Specifically, the TX beam ID may be included as one information item of the system information, or may be indicated in a form of a scrambling applied to the system information.

In block 405, the BS repetitively transmits the synchronization signal and the broadcast signal by performing beamforming on the signals by using different TX beams. In other words, during one SCH/BCH period, the BS transmits SCHs and BCHs which are beam-formed with different TX beams. Accordingly, one SCH/BCH period includes pairs of the SCH and the BCH by the number of TX beams supported by the BS. In this situation, when the BS operates a plurality of antenna areas in one cell, the BS transmits simultaneously the SCH and the BCH in the antenna areas. That is, since the antenna areas can be independently beam-formed, the BS forms one TX beam per antenna area, that is, forms simultaneously TX beams by the number of antenna areas.

In block 407, the BS determines whether a TX period of the SCH/BCH is over. For example, the TX period of the SCH/BCH may be a subframe, a frame, or a superframe. That is, the SCH/BCH period is periodically arranged, and has a fixed position in the frame. When the TX period of the SCH/BCH is over, the procedure returns to block 401. However, according to another embodiment of the present disclosure, the previously generated synchronization signal and broadcast signal may be reused. In this situation, the procedure returns to block 405.

Although not shown in FIG. 4, the BS may further perform a process of receiving a feedback of a preferred TX beam ID from the terminal which receives the SCH and the BCH. In this situation, the BS recognizes a preferred TX beam of the terminal, and uses the preferred TX beam of the terminal when performing scheduling.

Figure 5:
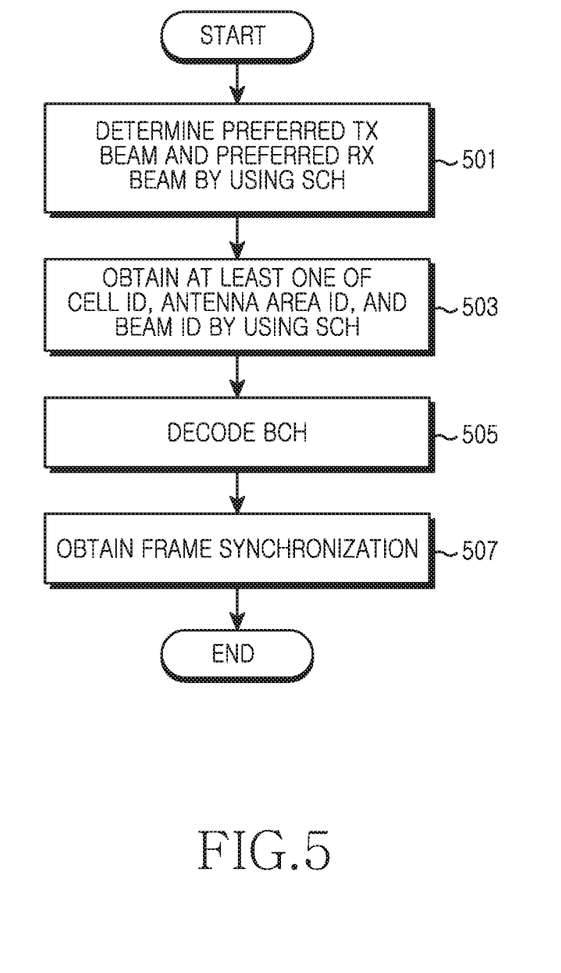
FIG. 5 is a flowchart illustrating an operation of a terminal in a wireless communication system according to an embodiment of the present disclosure.

FIG. 5 is a flowchart illustrating an operation of a terminal in a wireless communication system according to an embodiment of the present disclosure.

Referring to FIG. 5, the terminal determines a preferred TX beam and a preferred RX beam by using SCHs in block 501. The SCHs are periodically transmitted, and during one period, SCHs beam-formed with different TX beams are repetitively transmitted. For example, a TX period of the SCH may be a frame or a superframe. Therefore, since the terminal changes a RX beam in every period during a plurality of periods and receives the SCHs, the terminal can receive the SCHs by combining all of TX beams and RX beams. Accordingly, the terminal can determine one combination which maximizes RX signal strength as the preferred TX beam and the preferred RX beam. In this situation, the number of RX beams that can be simultaneously applied by the terminal may vary depending on the number of RX RF chains included in the terminal.

In block 503, the terminal obtains at least one of a cell ID, an antenna area ID, and a TX beam ID by using the SCHs.

A synchronization signal received through the SCH indicates the cell ID. When the BS operates a plurality of antenna areas in one cell, the synchronization signal further indicates the antenna area ID. In addition, according to one embodiment of the present disclosure, the synchronization signals may indicate TX beam IDs. The cell ID, the antenna area ID, and the TX beam ID can be indicated by using at least one of a sequence constituting the synchronization signal, a position of a subcarrier to which the synchronization signal is mapped, a scrambling code for the synchronization signal, a covering code, etc. That is, the terminal can identify at least one of the cell ID, the antenna area ID, and the TX beam ID by using at least one of the sequence of the detected synchronization signal, the position of the subcarrier to which the synchronization signal is mapped, the scrambling code for the detected synchronization signal, the covering code, etc. According to another embodiment of the present disclosure, the TX beam ID can be indicated by using the BCH. In this situation, the synchronization signals do not indicate the TX beam ID to be applied.

In block 505, the terminal decodes the BCH. The BCH is paired with the SCH. The BCH is beam-formed with the same TX beam as the SCH paired with the BCH. The BCH is spaced apart from the SCH which is paired with the BCH by a distance corresponding to the pre-set number of symbols. For example, as shown in FIG. 2, the SCH and the BCH which are paired to each other can be arranged in a contiguous manner. Therefore, the terminal which detects the synchronization signal can determine a position of a BCH beam-formed with the same TX beam from the synchronization signal. In this situation, the terminal can apply the preferred RX beam determined in block 501 to the BCH. The BCH delivers system information. The system information includes configuration information, system parameters, etc., used by the terminal to access the BS. According to one embodiment of the present disclosure, if the TX beam ID is indicated by the SCH, the broadcast signal is not different for each TX beam but is identical for each TX beam. Therefore, the terminal can increase a decoding gain by combining a plurality of broadcast signals. Alternatively, according to another embodiment of the present disclosure, if the TX beam ID is indicated through the BCH, the broadcast signal is different for each TX beam. Specifically, the TX beam ID may be included as one information item of the system information, or may be indicated in a form of a scrambling applied to the system information. When the TX beam ID is indicated in a form of a scrambling code, the terminal can increase a decoding gain by combining a plurality of broadcast signals after performing descrambling.

In block 507, the terminal obtains frame synchronization. That is, the terminal determines a boundary of a superframe, a frame, a subframe, etc., by using system information obtained through the BCH and a position of the detected synchronization signal. That is, the terminal determines a boundary of a SCH/BCH period by using the system information, and determines a boundary of the frame from the boundary of the SCH/BCH period. For example, if an end boundary of the SCH/BCH period has a fixed position in the frame, the terminal determines the number of SCHs by using the system information, calculates the number of SCHs located subsequent to the SCH detected by the terminal, determines the end boundary of the SCH/BCH period, and determines the boundary of the frame according to a positional relation of the end boundary and the frame. In this situation, if the position of the boundary of the SCH/BCH period on the frame is not pre-set, the terminal can obtain information for reporting the position of the boundary of the SCH/BCH period on the frame by using the system information.

Although not shown in FIG. 5, the terminal can further perform a process of feeding back a TX beam ID of the preferred TX beam determined in block 501.

Figure 6:
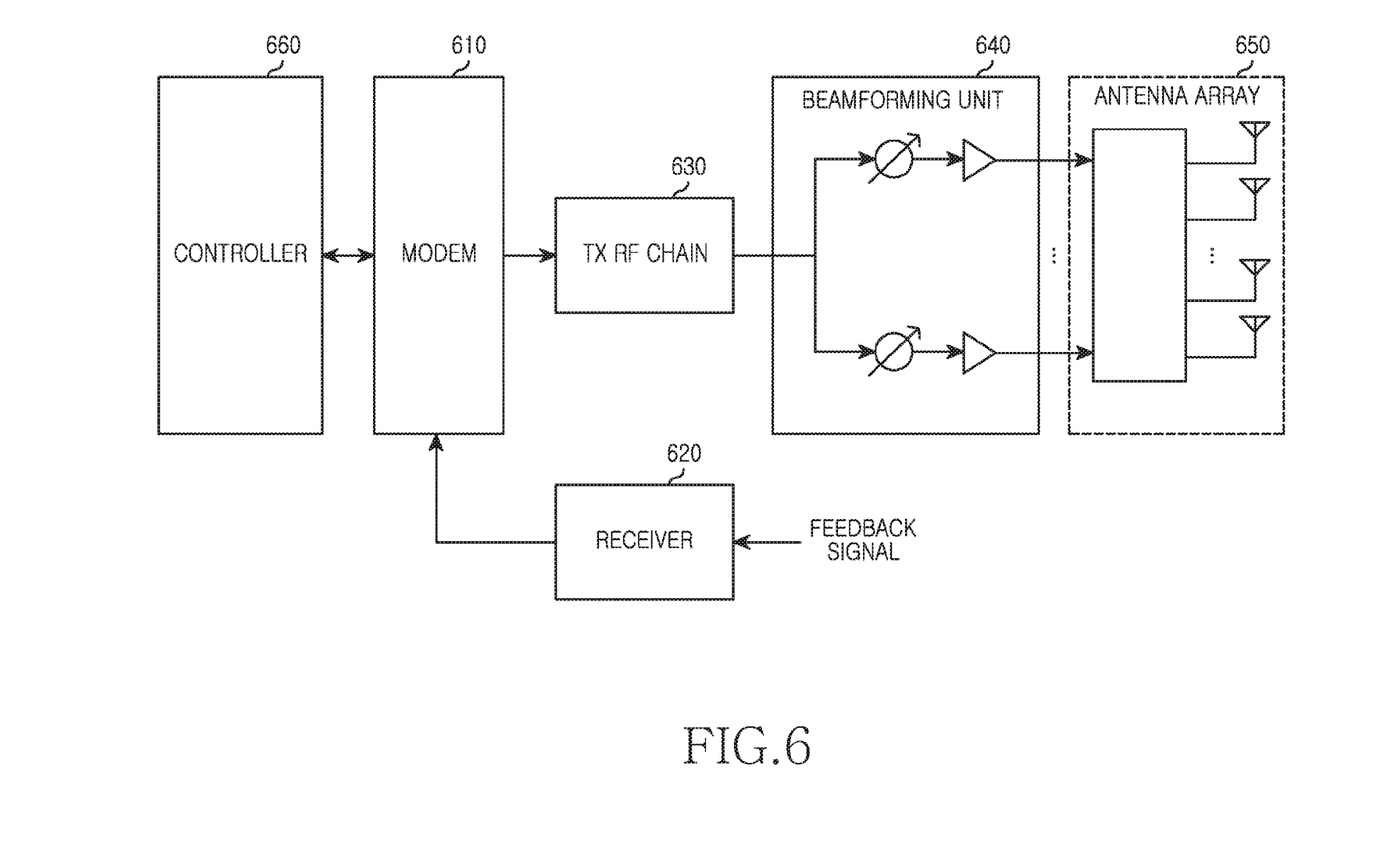
FIG. 6 is a block diagram illustrating a structure of a base station in a wireless communication system according to an embodiment of the present disclosure.

FIG. 6 is a block diagram illustrating a structure of a BS in a wireless communication system according to an embodiment of the present disclosure.

Referring to FIG. 6, the BS includes a modem 610, a receiver 620, a TX RF chain 630, a beamforming unit 640, an antenna array 650, and a controller 660.

The modem 610 performs a conversion function between a baseband signal and a bit-stream according to a physical layer standard of the system. For example, in an OFDM scheme, in a data transmission process, the modem 610 generates complex symbols by performing coding and modulation on a TX bit-stream, maps the complex symbols to subcarriers, and then configures OFDM symbols by performing an Inverse Fast Fourier Transform (IFFT) operation and a Cyclic Prefix (CP) insertion operation. In addition, in a data reception process, the modem 610 splits the baseband signal on an OFDM symbol basis, restores signals mapped to the subcarriers by using a Fast Fourier Transform (FFT) operation, and then restores a RX bit-stream by performing demodulation and decoding. The receiver 620 converts an RF signal received from the terminal into a baseband digital signal. Although not shown specifically, the receiver 620 includes an antenna, a RX RF chain, etc.

The TX RF chain 630 converts a baseband digital signal stream provided from the modem 610 into an RF analog signal. For example, the TX RF chain 630 can include an amplifier, a mixer, an oscillator, a Digital to Analog Converter (DAC), a filter, etc. Only one TX RF chain 630 is illustrated in FIG. 6. However, according to another embodiment of the present disclosure, the BS can include a plurality of TX RF chains. In this situation, the BS can simultaneously form a plurality of TX beams by the number of TX RF chains.

The beamforming unit 640 performs TX beamforming on a TX signal provided from the TX RF chain 630. For example, the beamforming unit 640 includes a plurality of phase converters, a plurality of amplifiers, and a signal adder. That is, the beamforming unit 640 splits the TX signal provided from the TX RF chain 630 by the number of the plurality of antennas included in the antenna array 650, and regulates a phase and size of each of the split signals. The antenna array 650 is a group of a plurality of antennas. The antenna array 650 includes a plurality of array elements, and transmits signals provided from the beamforming unit 640 through a radio channel.

The controller 660 controls an overall function of the BS. For example, the controller 660 generates a TX traffic packet and message and provides it to the modem 610, and interprets a RX traffic packet and message provided from the modem 610. In particular, the controller 660 provides control to transmit a SCH and a BCH according to one embodiment of the present disclosure. An operation of the controller 660 for transmitting the SCH and the BCH will be described below.

The controller 660 controls the modem 610 to determine a sequence of a synchronization signal and to generate the synchronization signal by demodulating the sequence. The synchronization signal indicates a cell ID. When the BS operates a plurality of antenna areas in one cell, the synchronization signal further indicates an antenna area ID. In this situation, the controller 660 generates different synchronization signals for respective antenna areas. In addition, according to one embodiment of the present disclosure, the synchronization signals can indicate TX beam IDs to be applied. In this situation, the controller 660 generates different synchronization signals for respective TX beams to be applied. The cell ID, the antenna area ID, and the TX beam ID can be indicated by using at least one of a sequence constituting the synchronization signal, a position of a subcarrier to which the synchronization signal is mapped, a scrambling code for the synchronization signal, a covering code, etc. According to another embodiment of the present disclosure, the TX beam ID can be indicated through a BCH, and the synchronization signals do not indicate the TX beam IDs to be applied.

Subsequently, the controller 660 controls the modem 610 to generate system information and to generate a broadcast signal by encoding and demodulating the sequence. According to one embodiment of the present disclosure, if the TX beam ID is indicated by the SCH, the broadcast signal is not different for each TX beam but is identical for each TX beam. Alternatively, according to another embodiment of the present disclosure, if the TX beam ID is indicated through the BCH, the broadcast signal is different for each TX beam. Specifically, the TX beam ID may be included as one information item of the system information, or may be indicated in a form of a scrambling applied to the system information. The system information can include information for reporting the number of TX beams supported by the BS so that the terminal can obtain frame synchronization.

The controller 660 controls the beamforming unit 640 to periodically transmit the synchronization signal and the broadcast signal and to repetitively transmit the synchronization signal and the broadcast signal during one period such that the repetitively transmitted synchronization signals and broadcast signals are beam-formed with different TX beams. In other words, during one SCH/BCH period, the controller 660 transmits SCHs and BCHs, which are beam-formed with different TX beams. In this situation, when the BS operates a plurality of antenna areas in one cell, the controller 660 transmits simultaneously the SCH and the BCH in the antenna areas. When the BS operates a plurality of antenna areas, the BS includes a plurality of TX RF chains, or allocates antenna elements of the antenna array 650 to the plurality of antenna areas in a divided manner.

In addition, the controller 660 controls the receiver 620 to receive a feedback of a preferred TX beam ID from the terminal which receives the SCH and the BCH. The controller 660 recognizes a preferred TX beam of the terminal, and uses the preferred TX beam of the terminal when performing scheduling.

Figure 7:
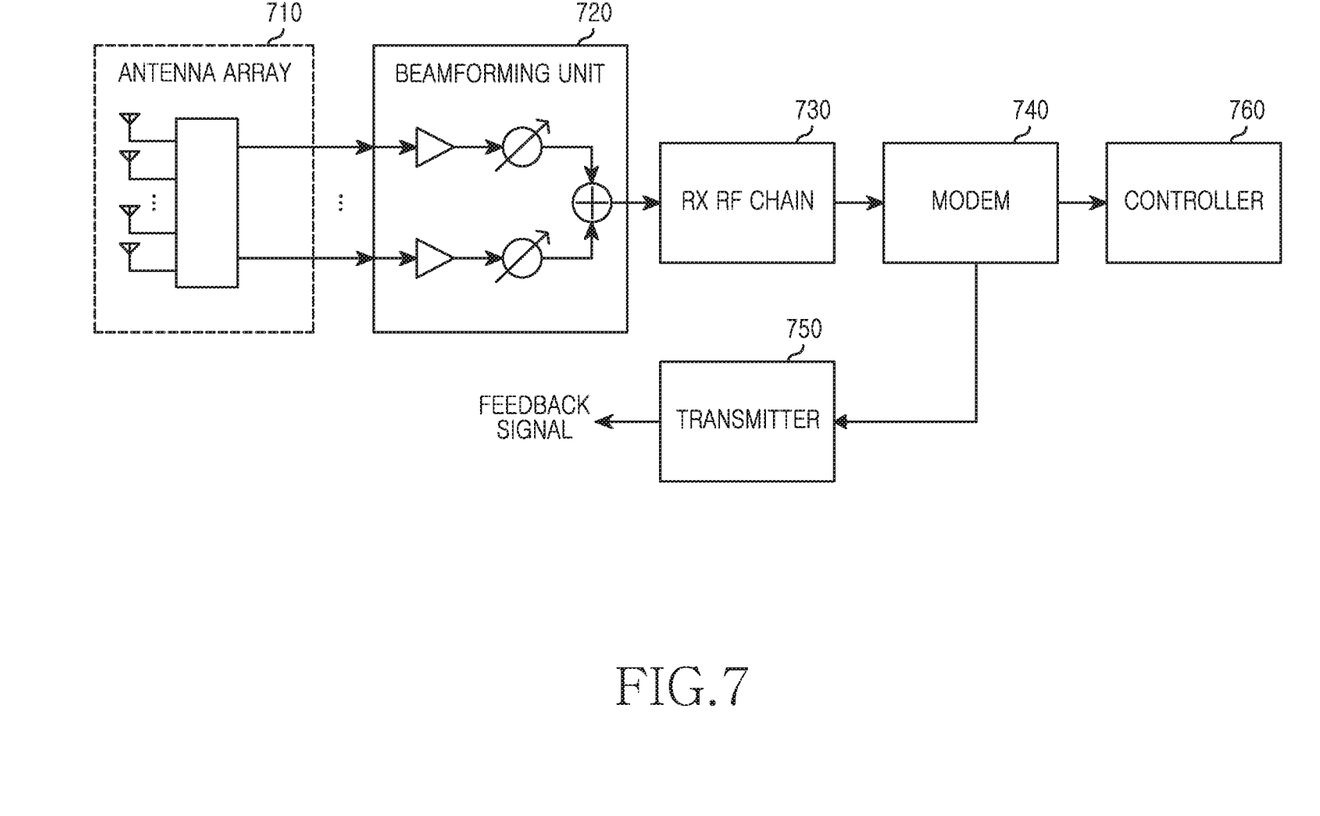
FIG. 7 is a block diagram illustrating a structure of a terminal in a wireless communication system according to an embodiment of the present disclosure.

FIG. 7 is a block diagram illustrating a structure of a terminal in a wireless communication system according to an embodiment of the present disclosure.

Referring to FIG. 7, the terminal includes an antenna array 710, a beamforming unit 720, a RX RF chain 730, a modem 740, a transmitter 750, and a controller 760.

The antenna array 710 is a group of antennas, and includes a plurality of array elements. The beamforming unit 720 performs RX beamforming on a signal received through a plurality of antennas which constitute the antenna array 710. For example, the beamforming unit 720 includes a plurality of phase converters, a plurality of amplifiers, and a signal adder. That is, the beamforming unit 720 performs RX beamforming by regulating and adding phases of signals received through the respective antennas. The RX RF chain 730 converts an RF analog RX signal into a baseband digital signal. For example, the RX RF chain 730 can include an amplifier, a mixer, an oscillator, an Analog to Digital Converter (ADC), a filter, etc. Only one RX RF chain 730 is illustrated in FIG. 7. However, according to another embodiment of the present disclosure, the terminal can include a plurality of RX RF chains. In this situation, the terminal can simultaneously form a plurality of RX beams by the number of RX RF chains.

The modem 740 performs a conversion function between a baseband signal and a bit-stream according to a physical layer standard of the system. For example, in an OFDM scheme, in a data transmission process, the modem 740 generates complex symbols by performing coding and modulation on a TX bit-stream, maps the complex symbols to subcarriers, and then configures OFDM symbols by performing an IFFT operation and a CP insertion operation. In addition, in a data reception process, the modem 740 splits the baseband signal provided from the RX RF chain 730 on an OFDM symbol basis, restores signals mapped to the subcarriers by using an FFT operation, and then restores a RX bit-stream by performing demodulation and decoding. In particular, the modem 740 measures RX signal strength for synchronization signals transmitted from a BS. More specifically, the modem 740 detects SCHs transmitted from the BS, measures RX signal strength for each SCH, and then provides the RX signal strength to the controller 760.

The transmitter 750 converts a TX signal provided from the modem 740 into a RF signal and then transmits the RF signal to the BS. Although not shown specifically, the transmitter 750 includes a TX RF chain, an antenna, etc.

The controller 760 controls an overall function of the terminal. For example, the controller 760 generates a TX traffic packet and message and provides it to the modem 740, and interprets a RX traffic packet and message provided from the modem 740. In particular, the controller 760 provides control to determine preferred TX/RX beams by detecting a SCH and a BCH and to obtain synchronization and system information. An operation of the controller 760 for detecting the SCH and the BCH will be described below.

The controller 760 determines a preferred TX beam and a preferred RX beam by using SCHs transmitted from the BS. The controller 760 controls the beamforming unit 720 to change a RX beam in every period during a plurality of periods and to receive the SCHs, and thus acquires RX signal strength for combinations of all of TX beams and RX beams. Accordingly, the controller 760 can determine one combination which maximizes RX signal strength as the preferred TX beam and the preferred RX beam. In this situation, the number of RX beams that can be simultaneously applied by the terminal may vary depending on the number of RX RF chains included in the terminal. Further, the controller 760 can feed back a TX beam ID of the preferred TX beam by using the transmitter 750.

The controller 760 obtains at least one of a cell ID, an antenna area ID, and a TX beam ID by using the SCHs. A synchronization signal received through the SCH indicates the cell ID. When the BS operates a plurality of antenna areas in one cell, the synchronization signal further indicates the antenna area ID. In addition, according to one embodiment of the present disclosure, the synchronization signals may indicate TX beam IDs. That is, the controller 760 can identify at least one of the cell ID, the antenna area ID, and the TX beam ID by using at least one of the sequence of the synchronization signal detected by the modem 740, the position of the subcarrier to which the synchronization signal is mapped, the scrambling code for the detected synchronization signal, the covering code, etc. According to another embodiment of the present disclosure, the TX beam ID can be indicated by using the BCH. In this situation, the synchronization signals do not indicate the TX beam ID to be applied.

The controller 760 controls the modem 740 to decode the BCH. The BCH is paired with the SCH. The BCH is beam-formed with the same TX beam as the SCH paired with the BCH. Therefore, the modem 740 which detects the synchronization signal determines a position of a BCH beam-formed with the same TX beam from the synchronization signal, decodes the BCH, and provides a decoding result of the BCH to the controller 760. According to one embodiment of the present disclosure, if the TX beam ID is indicated by the SCH, the broadcast signal is not different for each TX beam but is identical for each TX beam. Therefore, in this situation, the modem 740 can increase a decoding gain by combining signals received through a plurality of BCHs. Alternatively, according to another embodiment of the present disclosure, if the TX beam ID is indicated through the BCH, the broadcast signal is different for each TX beam. Specifically, the TX beam ID may be included as one information item of the system information, or may be indicated in a form of a scrambling applied to the system information. In this situation, the modem 740 can increase a decoding gain by combining the signals received through the plurality of BCHs after performing descrambling.

The controller 760 obtains frame synchronization. That is, the controller 760 determines a boundary of a superframe, a frame, a subframe, etc., by using system information obtained through the BCH and a position of the detected synchronization signal. That is, the controller 760 determines a boundary of a SCH/BCH period by using the system information, and obtains the frame synchronization from the boundary. For example, if an end boundary of the SCH/BCH period has a fixed position in the frame, the controller 760 determines the number of SCHs by using the system information, determines the number of SCHs located subsequent to the SCH detected by the terminal, determines the end boundary of the SCH/BCH period, and determines the boundary of the frame according to a positional relation of the end boundary and the frame. In this situation, if the position of the boundary of the SCH/BCH period on the frame is not pre-set, the controller 760 can obtain information for reporting the position of the boundary of the SCH/BCH period on the frame by using the system information.

The present disclosure provides a process for obtaining synchronization by using a SCH and a BCH which are subjected to beamforming and for obtaining system information in a wireless communication system. Therefore, beamforming can be applied by using a process for obtaining initial synchronization, thereby enabling effective communication.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

What is claimed is:

1. A method of operating a base station in a wireless communication system, the method comprising:
    transmitting, on a first resource via a first transmit beam in a first subframe, a broadcast signal and a synchronization signal; and
    transmitting, on a second resource via a second transmit beam in the first subframe, the broadcast signal and the synchronization signal,
    wherein a direction of transmission of the first transmit beam is different from a direction of transmission of the second transmit beam,
    wherein the broadcast signal and the synchronization signal occupy a part of an operation bandwidth,
    wherein the synchronization signal comprises a first synchronization signal and a second synchronization signal that are mapped to different resources, and
    wherein the broadcast signal comprises information for identifying the first resource and the second resource.

2. The method of claim 1, wherein the synchronization signal enables identification of a location of each of the first resource and the second resource.

3. The method of claim 1, wherein transmitting, on the first resource via the first transmit beam the broadcast signal and the synchronization signal comprises forming the first transmit beam for a first antenna area by using a first antenna group among a plurality of antenna groups allocated respectively to a plurality of antenna areas included in one cell, and
    wherein transmitting, on the second resource via the second transmit beam, the broadcast signal and the synchronization signal comprises forming the second transmit beam for a second antenna area by using a second antenna group among the plurality of antenna groups.

4. The method of claim 3, wherein the first transmit beam for the first antenna area and the second transmit beam for the second antenna area are formed simultaneously.

5. The method of claim 1, wherein the synchronization signal enables identification of a boundary of a subframe in which the first resource and the second resource are included.

6. A base station in a wireless communication system, the base station comprising:
    a transceiver; and
    at least one processor coupled to the transceiver and configured to:
        transmit, on a first resource via a first transmit beam in a first subframe, a broadcast signal and a synchronization signal; and transmit, on a second resource via a second transmit beam in the first subframe, the broadcast signal and the synchronization signal, wherein a direction of transmission of the first transmit beam is different from a direction of transmission of the second transmit beam, wherein the broadcast signal and the synchronization signal occupy a part of an operation bandwidth, wherein the synchronization signal comprises a first synchronization signal and a second synchronization signal that are mapped to different resources, and wherein the broadcast signal comprises information for identifying the first resource and the second resource.

7. The base station of claim 6, wherein the synchronization signal enables identification of a location of each of the first resource and the second resource.

8. The base station of claim 6, wherein the at least one processor is configured to:

form the first transmit beam for a first antenna area using a first antenna group among a plurality of antenna groups allocated respectively to a plurality of antenna areas included in one cell, and form the second transmit beam for a second antenna area using a second antenna group among the plurality of antenna groups.

9. The base station of claim 8, wherein the synchronization signal enables identification of:

an antenna area identifier of an antenna area corresponding to an antenna group that transmits the synchronization signal, or an identifier of each of the transmit beams which transmits the synchronization signal.

10. The base station of claim 6, wherein the synchronization signal enables identification of a boundary of a subframe in which the first resource and the second resource are included.

11. A terminal in a wireless communication system, the terminal comprising:

a transceiver; and at least one processor coupled to the transceiver and configured to:

receive a broadcast signal and a synchronization signal transmitted from a base station on a first resource via a first transmit beam in a first subframe; and receive the broadcast signal and the synchronization signal transmitted from the base station on a second resource via a second transmit beam in the first subframe, wherein the first transmit beam is transmitted from a first direction and the second transmit beam is transmitted from a second direction, wherein the broadcast signal and the synchronization signal occupy a part of an operation bandwidth, wherein the synchronization signal comprises a first synchronization signal and a second synchronization signal that are mapped to different resources, and wherein the broadcast signal comprises information for identifying the first resource and the second resource.

12. The terminal of claim 11, wherein the synchronization signal enables identification of a location of each of the first resource and the second resource.

13. The terminal of claim 11, wherein the at least one processor is configured to obtain system information from the broadcast signal included in each of the transmit beams and obtain frame synchronization by using the system information.

14. The terminal of claim 13, wherein the at least one processor is configured to:

determine a boundary of a period in which the broadcast signal and the synchronization signal are repetitively transmitted by using the system information, and determine a boundary of a frame from the boundary of the period.

15. The terminal of claim 11, wherein the at least one processor is configured to determine a combination of a preferred transmission beam and a preferred reception beam which minimize reception signal strength.

16. The terminal of claim 11, wherein the at least one processor is further configured to transmit a feedback containing an identifier indicating a preferred transmit beam, to the base station.

17. The terminal of claim 11, wherein the synchronization signal enables identification of a boundary of a subframe in which the first resource and the second resource are included.

18. The method of claim 1, wherein each of the synchronization signal and the broadcast signal occupies a resource having a same length in time axis.

19. The base station of claim 6, wherein each of the synchronization signal and the broadcast signal occupies a resource having a same length in time axis.

20. The terminal of claim 11, wherein each of the synchronization signal and the broadcast signal occupies a resource having a same length in time axis.

* * * * *